US008332660B2

(12) United States Patent
Paver et al.

(10) Patent No.: US 8,332,660 B2
(45) Date of Patent: Dec. 11, 2012

(54) PROVIDING SECURE SERVICES TO A NON-SECURE APPLICATION

(75) Inventors: Nigel Charles Paver, Austin, TX (US); Stuart David Biles, Suffolk (GB); Donald Felton, Cambridgeshire (GB)

(73) Assignee: ARM Limited, Cambridge (GB)

( * ) Notice: Subject to any disclaimer, the term of this patent is extended or adjusted under 35 U.S.C. 154(b) by 1174 days.

(21) Appl. No.: 12/003,857

(22) Filed: Jan. 2, 2008

(65) Prior Publication Data

US 2009/0172329 A1  Jul. 2, 2009

(51) Int. Cl.
G06F 11/30 (2006.01)
G06F 12/14 (2006.01)
G06F 7/04 (2006.01)
G06F 17/30 (2006.01)
H04N 7/16 (2011.01)

(52) U.S. Cl. ............................ 713/194; 713/193; 726/27

(58) Field of Classification Search .................. 711/163, 711/100, 147, 152; 713/164–167, 1–2, 192–194; 726/2, 16–17, 21, 26–29; 718/100
See application file for complete search history.

(56) References Cited

U.S. PATENT DOCUMENTS

| 5,845,327 | A | 12/1998 | Rickard et al. |
| 6,684,305 | B1 | 1/2004 | Deneau |
| 7,827,326 | B2 * | 11/2010 | Bosch et al. ................... 710/36 |
| 8,028,164 | B2 * | 9/2011 | Paatero ........................ 713/164 |
| 2002/0069316 | A1 | 6/2002 | Mattison |
| 2003/0028751 | A1 | 2/2003 | McDonald et al. |
| 2003/0172265 | A1 * | 9/2003 | Vu et al. ....................... 713/164 |
| 2004/0177269 | A1 | 9/2004 | Belnet et al. |
| 2004/0215898 | A1 | 10/2004 | Arimilli et al. |
| 2005/0160210 | A1 * | 7/2005 | Watt et al. ..................... 710/269 |
| 2005/0216701 | A1 | 9/2005 | Taylor |
| 2006/0015754 | A1 | 1/2006 | Drehmel et al. |
| 2006/0064546 | A1 | 3/2006 | Arita et al. |
| 2006/0200802 | A1 | 9/2006 | Mott et al. |
| 2006/0285682 | A1 | 12/2006 | Sarangarajan et al. |

(Continued)

FOREIGN PATENT DOCUMENTS

JP  2001-318787  11/2001

(Continued)

OTHER PUBLICATIONS

UK Search Report dated Feb. 20, 2009 for GB 0820439.8.

(Continued)

*Primary Examiner* — Philip Chea
*Assistant Examiner* — Trong Nguyen
(74) *Attorney, Agent, or Firm* — Nixon & Vanderhye P.C.

(57) ABSTRACT

A data processor for processing data in a secure mode having access to secure data that is not accessible to the data processor when processing data in the non-secure mode. A further processing device for performing a task in response to a request from the data processor issued from the non-secure mode. The further processing device including a secure data store not accessible to processes running on the data processor when in the non-secure mode. Prior to issuing requests, the data processor in the secure mode performs a set up operation on the further data processing device storing secure data in the secure data store. In response to receipt of the request from the data processor operating in the non-secure mode, the further data processing device performs the task using data stored in the secure data store to access any secure data required.

18 Claims, 8 Drawing Sheets

U.S. PATENT DOCUMENTS

| | | | |
|---|---|---|---|
| 2006/0294370 A1* | 12/2006 | Greenspan | ................... 713/164 |
| 2007/0199046 A1 | 8/2007 | O'Brien | |
| 2007/0277036 A1 | 11/2007 | Chamberlain et al. | |
| 2008/0098205 A1 | 4/2008 | Dolve et al. | |
| 2008/0189500 A1 | 8/2008 | Jennings et al. | |
| 2008/0222383 A1 | 9/2008 | Spracklen et al. | |
| 2008/0263621 A1 | 10/2008 | Austerlitz et al. | |
| 2009/0007275 A1 | 1/2009 | Gehrmann | |
| 2009/0028343 A1 | 1/2009 | Sprunk | |
| 2009/0049443 A1 | 2/2009 | Powers et al. | |
| 2009/0164797 A1 | 6/2009 | Kramer | |
| 2009/0320048 A1 | 12/2009 | Watt et al. | |

FOREIGN PATENT DOCUMENTS

| | | |
|---|---|---|
| JP | 2004-171563 | 6/2004 |
| JP | 2007-304847 | 11/2007 |
| WO | WO 99/61982 | 12/1999 |
| WO | WO 99/61989 | 12/1999 |
| WO | WO 2004/046916 | 6/2004 |
| WO | WO 2005/101213 | 10/2005 |
| WO | WO 2006/126686 | 11/2006 |
| WO | WO 2006/131921 | 12/2006 |

OTHER PUBLICATIONS

UK Search Report dated Feb. 23, 2009 for GB 0820711.0.
UK Search Report dated Jan. 19, 2009 for GB 081825.1.
U.S. Appl. No. 12/000,005, Paver et al., filed Dec. 6, 2007.
U.S. Appl. No. 12/003,858, Paver et al, filed Jan. 2, 2008.
M. Vuletic et al, "Multithreaded Virtual-Memory-Enabled Reconfigurable Hardware Accelerators" IEEE Conf. Field Programmable Technology, Dec. 2006, pp. 197-204.
Office Action mailed Apr. 12, 2011 in co-pending U.S. Appl. No. 12/003,858.
Office Action mailed Sep. 26, 2011 in co-pending U.S. Appl. No. 12/003,858.

* cited by examiner

PROVIDING SECURE SERVICES TO A NON-SECURE APPLICATION

BACKGROUND OF THE INVENTION

1. Field of the Invention

The field of the invention relates to data processing and in particular to processing secure and non-secure data using additional processing devices to perform tasks under control of a first data processor.

2. Description of the Prior Art

Data processing apparatus that can handle secure data are known and are generally arranged such that when the secure data is being handled the processor is operating in a secure mode. When operating in the secure mode the data processing apparatus can access secure data that is not accessible in a non-secure mode. To keep the secure data isolated from the non-secure processes switching between modes requires various handling routines to be run to ensure no leakage of secure data between the secure and non-secure sides. Thus, generally in response to a request for a secure service such as a cryptographic process to be performed the system makes an operating system call and enters privileged mode. From there a call is made to the secure mode and handling routines are performed to ensure that secure mode is entered correctly. The secure service can then be performed, after which the system switches back to non-secure mode, which requires further handling routines to be performed. Thus, if the secure service is only a small task the switching can be a very large overhead in performance.

SUMMARY OF THE INVENTION

A first aspect of the present invention provides a data processing apparatus comprising a data processor for processing data in a secure and a non-secure mode, said data processor processing data in said secure mode having access to secure data that is not accessible to said data processor processing data in said non-secure mode; and a further processing device for performing a task in response to a request from said data processor issued from said non-secure mode, said task comprising processing data at least some of which is secure data, said further processing device comprising a secure data store, said secure data store not being accessible to processes running on said data processor in non-secure mode; wherein prior to issuing any of said requests said data processor is adapted to perform a set up operation on said further data processing device, said set up operation being performed by said data processor operating in said secure mode and comprising storing secure data in said secure data store on said further processing device, said secure data being secure data required by said further processing device to perform said task; wherein in response to receipt of said request from said data processor operating in said non-secure mode said further data processing device performs said task using data stored in said secure data store to access any secure data required.

The present invention comprises a data processor that can process both secure and non-secure data in secure mode and can process non-secure data in non-secure mode. It also has a further processing device which it can use to perform particular tasks that this further processing device is designed to perform efficiently and thereby, increase performance of the overall apparatus. The present invention recognises that the isolation of secure data from the non-secure side requires careful handling and thus, switching from one side to the other may take several hundreds of cycles. Thus, if an application is running on a non-secure side on the data processor if it were to require a further processing device to perform processing of some secure data, performing the general handling tasks involved with switching from non-secure to secure side each time it instructed the further processing device would negatively impact performance unless the further processing device was performing an operation that took many cycles. The present invention addresses this problem by providing the further processing device with a secure data store and configuring the data processor such that it performs a set up operation from the secure mode to set the further processing device up by storing in its secure data store any secure data it needs to perform its secure tasks. Thus, by providing a further processing device with a secure data store and allowing the data processor to set it up in secure mode, tasks can be performed that use secure data in response to a request from the data processor operating in this non-secure mode without the need to switch modes. This can save many cycles of handling time and enables small secure tasks to be performed by the further processing device while still improving the efficiency of the overall device.

In some embodiments, said stored secure data comprises at least one address of a secure portion of a memory, said further data processing apparatus accessing secure data stored in said at least one address while performing said task.

Although the secure data may comprise a number of things, it may comprise one or more addresses indicating locations within the secure portions of the memory. By providing the further data processing means with this information, it can access the secure portions of the memory and can thus, use secure data stored there in its tasks.

In some embodiments, said further data processing apparatus is adapted to store at least some data generated while performing said task in said secure portion of said memory at a place indicated by at least one of said at least one address.

Furthermore, by providing what is in effect a pointer from the further processing device to the secure portion of the memory, access to the secure portion of the memory is granted to the further processing device albeit to predetermined locations there, and this can be used by the further processing device to store any sensitive data that it may generate during its process. This enables the secure integrity of the system to be maintained.

In some embodiments, said data processor is adapted to process a plurality of applications and is adapted to perform said set up operation in response to a context switch to any one of said plurality of applications that issue said requests during processing.

Although the data processor may perform the setup operation to allow the further processing device to perform its task at various different times, in some embodiments it performs it in response to a context switch to a particular application. It may be convenient to set up the further processing device to perform a task that is requested by a particular application. If the particular application were to request the task to be performed many times, performing a setup operation only at the start of the application and not again while the application is actually running allows the setup operation to be performed only once for this application and therefore saves handling time, while allowing only secure data relating to tasks that that particular application requests to be stored in the further processing device. This provides a good compromise between security and improving performance.

In some embodiments, said data processor is adapted to process a plurality of applications and is adapted to perform said set up operation following reset for at least some of said plurality of applications and is adapted to additionally perform said set up operation for a further application not previously set up in response to detecting a context switch to said further application.

Alternatively, the setup operation may be performed for tasks that several or indeed all the applications that the data processor is adapted to process performs. This has the advantage that the setup operation needs to be performed less often, but more secure information will need to be stored in the further processing device.

In the case that a setup operation is performed for some of the plurality of applications that the data processor is adapted to perform, these applications will be processed and tasks will be requested and performed until the data processor performs a context switch to a new application that may request a task from the further processing device that the further processing device has not been set up with secure data to perform. In response to this context switch, the data processor will switch to secure mode and send the secure data required for processing this application to the further processing device. It will then switch to non-secure mode and continue processing. It can then continue processing the application that it was originally set up to process and this further application. If another application is switched to that the further processing device has not been set up to process then once again it will need to switch to secure mode. In this way, a number of applications can be processed without the need to perform a large number of secure handling tasks.

Although, the data processing security may be controlled in a number of ways, in some embodiments said data processor further comprises a monitor mode, switching between processing in said secure and non-secure modes being performed via said monitor mode.

The use of a monitor mode which is the most privileged and secure mode of the data processing apparatus to control switching between secure and non-secure modes is a convenient and efficient way of controlling security.

In some embodiments, said further processing device is responsive to receipt of said request to issue a secure interrupt to said data processor, said secure interrupt causing said data processor to switch to said monitor mode and to perform an integrity check of said application issuing said request, said further processing device performing said task following receipt of a signal from said data processor indicating a positive integrity check.

The data processing apparatus may in some embodiments issue a secure interrupt when the further processing device is requested. By enabling the further processing device to issue a secure interrupt to the data processor, the switch to monitor mode can be performed efficiently without the need for software intervention which takes more cycles. Once in monitor mode the integrity of the application that requested the further data processing device can be checked. This provides additional security. The further processing device is providing a secure service to an application that is non-secure. Thus, it may be advantageous to be able to check the integrity of the application that called the further processing device to perform the secure task.

In some embodiments, said further processing device is adapted to detect predetermined behavior with respect to a plurality of said requests issued by said data processor and in response to detection of said predetermined behavior generates a secure interrupt, said secure interrupt causing said data processor to switch to said monitor mode.

A further security improvement can be produced by providing the further processing device with logic that enables it to detect predetermined behaviour related to the request that it receives to perform its tasks. If certain behaviour is detected it can then issue a secure interrupt and this allows the data processor to switch to monitor mode and analyse the application.

The predetermined behaviour may, for example, be a plurality of requests with the same key and different data. This is a typical way that a hacker may try to acquire information regarding a secure key and therefore, enabling the further processing device to both detect this behaviour and notify the data processor helps counter such a known way of attacking the security of the system. Alternative suspicious behaviour might be a plurality of requests with the same data and different keys.

In some embodiments, said secure data store of said further data processing device is configured to store a table of secure data items and a hash value associated with each data item within said table, said table being filled during said set up operation, said request issued from said data processor requesting an item from said table and supplying a corresponding hash value with said request, said further data processing device only allowing use of said requested item in response to said hash value supplied matching said hash value stored in association with said requested item.

The secure data stored in the further data processing device may be in the form of a table and to increase security have hash values associated with each data item stored in the table. The further processing device can then be configured to only allow use of requested data items in the table in response to the request having the corresponding hash value. This provides a further security check between the user application requesting the secure service and the secure data stored by the further processing device.

In some embodiments, said further processing device further comprises a secure register, said secure register being filled with an address in a secure portion of said memory and said table being filled with offset values to said address and corresponding hash values during said set up operation.

Although the secure data can be stored in a number of forms, in some embodiments there is an address indicating a location in a secure portion of the memory stored in a secure register in the further processing device and a table of values that indicate offsets from this address. There are corresponding hash values associated with the offset such that only requests that have the required hash value can use the information.

In some embodiments, said further processing device comprises a cryptography processing device and said stored secure data comprises at least one address of a cryptography key.

Although, the further processing device can be a device for performing a number of functions, in some embodiments it is a cryptography processing device. Cryptography processing devices need to use secure data in the form of keys. Furthermore, there are many user applications that may wish to perform cryptographic functions. Thus, providing cryptographic functions in a further processing device so it can be requested from a non-secure application on a data processor and yet can handle secure keys in a secure manner without passing through the normal secure handling routine of the data processor enables these cryptographic functions to be performed efficiently from a non-secure application.

Although, the further processing device may take a number of forms, in some embodiments it comprises a non-programmable hardware device.

Hardware devices can not only perform selected tasks particularly efficiently, they are also extremely secure as they cannot be attacked by user software. Thus, providing such a device to perform secure tasks enables these secure tasks to be performed on request from a non-secure application without compromising security unduly.

In some embodiments, said further data processing device is constrained such that said at least one address is in a predetermined part of said secure memory portion and access to other parts of said secure memory portion are not allowed.

It may be advantageous to constrain the further processing device so that it can only access certain portions of the secure memory. Although, the further processing device has a secure data store and may be difficult to hack into, it may be advantageous to only allow it to access certain parts of the secure memory to improve security and to provide confidence that certain data can never be accessed via this device.

A further aspect of the present invention provides, a method of processing data on a data processing apparatus comprising a data processor for processing data in a secure and a non-secure mode, said data processor processing data in said secure mode having access to secure data that is not accessible to said data processor processing data in said non-secure mode; and a further processing device comprising a secure data store; comprising the steps of:

said data processor operating in said secure mode performing a set up operation on said further processing device comprising storing secure data in said secure data store on said further processing device, said secure data being secure data required by said further processing device to perform a task said task comprising processing data at least some of which is secure data;

said data processor switching to a non-secure mode;

said data processor processing an application and issuing a request to said further processing device to perform said task while processing said application;

in response to receipt of said request said further data processing device performing said task using data stored in said secure data store to access any secure data required.

A yet further aspect of the present invention provides, a data processing apparatus comprising a processing means for processing data in a secure and a non-secure mode, said processing means processing data in said secure mode having access to secure data that is not accessible to said processing means processing data in said non-secure mode; and a further processing means for performing a task in response to a request from said processing means issued from said non-secure mode, said task comprising processing data at least some of which is secure data, said further processing means comprising a secure data store, said secure data store not being accessible to processes running on said processing means in non-secure mode; wherein prior to issuing any of said requests said processing means is configured to perform a set up operation on said further data processing means, said set up operation being performed by said processing means operating in said secure mode and comprising storing secure data in said secure data store on said further processing means, said secure data being secure data required by said further processing means to perform said task; wherein in response to receipt of said request from said processing means operating in said non-secure mode said further data processing means performs said task using data stored in said secure data store to access any secure data required.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
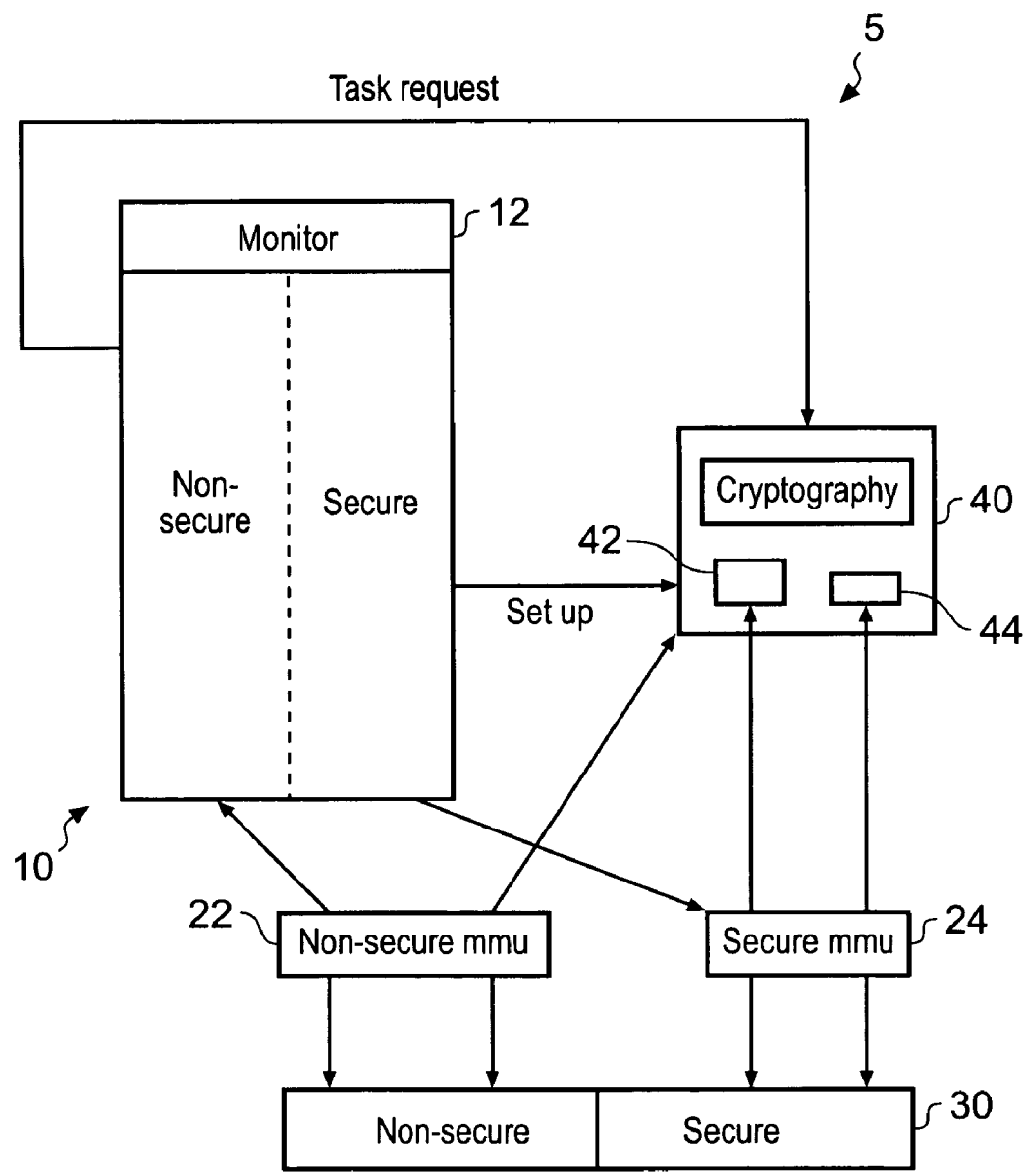
FIG. 1 shows a data processing apparatus according to an embodiment of the present invention.

FIG. 1 shows a data processing apparatus 5 having a core 10 that can operate in a secure and a non-secure mode. The system is provided with a monitor program 12 which executes at least partially in a monitor mode. A security status flag is write accessible only within the monitor mode and may be written by the monitor program. The monitor program is responsible for managing all changes between the secure domain and the non-secure domain in either direction. From a view external to the core the monitor mode is always secure and the monitor program is in secure memory. The monitor mode 12 can be considered a secure processing mode, since the secure status flag may be changed in this mode and monitor program in the monitor mode 12 has the ability to itself set the security status flag it effectively provides the ultimate level of security within the system as a whole.

The monitor mode has the highest level of security access in the system and is the only mode entitled to switch the system between the non-secure domain and the secure domain in either direction. Thus, all domain switches take place via a switch to the monitor mode and the execution of the monitor program within the monitor mode.

Within the non-secure domain there is provided a non-secure operating system which runs a plurality of non-secure application programs which execute in co-operation with the non-secure operating system In the secure domain, a secure kernel program is provided. The secure kernel program can be considered to form a secure operating system. Typically such a secure kernel program will be designed to provide only those functions which are essential to processing activities which must be provided in the secure domain such that the secure kernel can be as small and simple as possible since this will tend to make it more secure.

When switching between the secure and non-secure modes, the monitor mode is always invoked to control the security of the data and ensure that data that is secure is never available to the non-secure side. To enter monitor mode a secure privileged mode is first entered. Monitor mode cannot be entered from a non-privileged secure mode except in response to a secure interrupt.

Thus, when the core wishes to switch from the non-secure to the secure mode it switches first to the privileged non-secure mode and then a call is made to the secure mode and the device switches to monitor mode where various handling routines are run and then the core 10 switches to secure mode.

Figure 2:
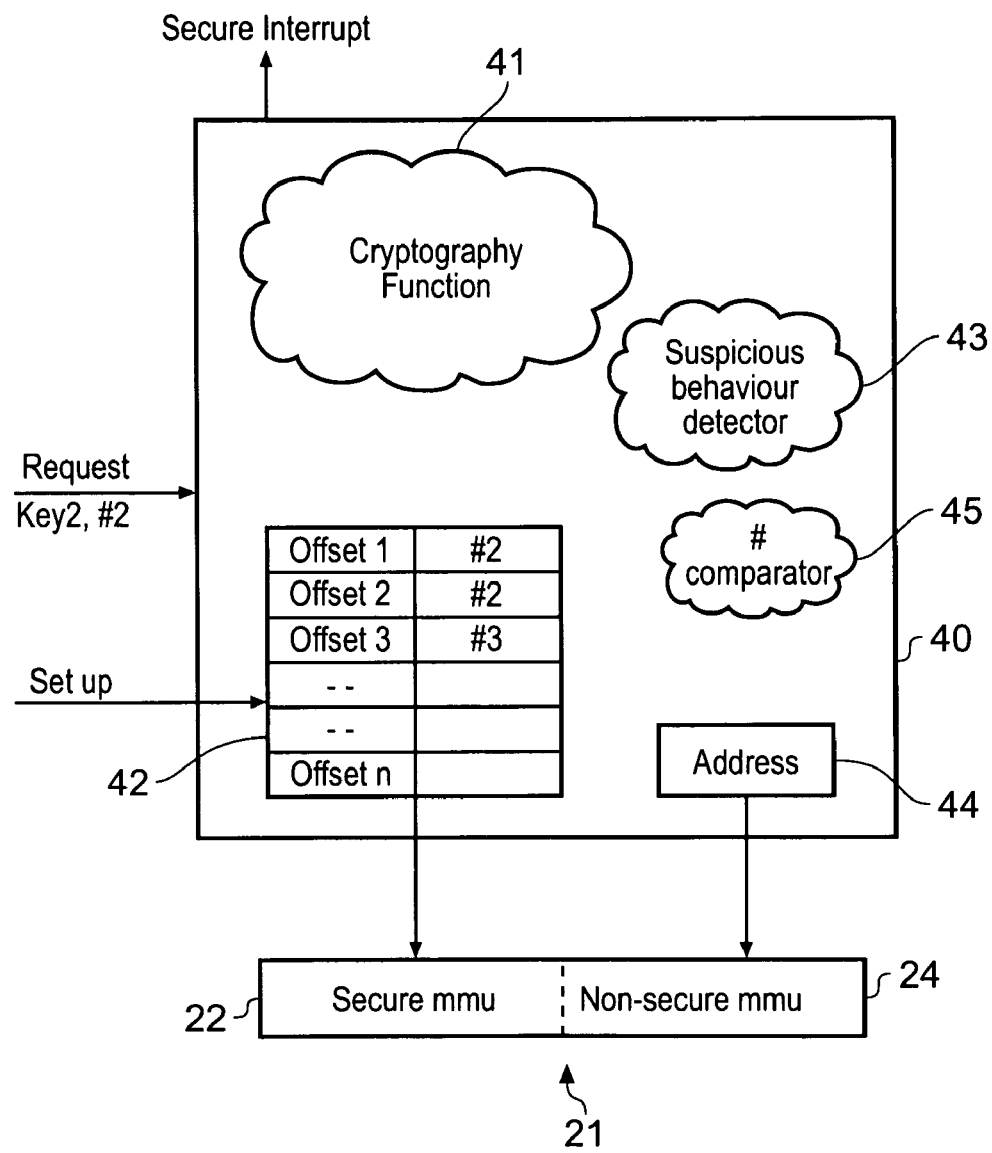
FIG. 2 shows the cryptography device of FIG. 1 in more detail.

Data processing apparatus 5 also comprises a non-secure memory management unit 22 and a secure memory management unit 24. In secure mode the core 10 looks at the memory through secure memory management unit 24 and thus, has a different view of memory 30 than it has in non-secure mode when it looks at the memory through non-secure memory management unit 22. In other embodiments, there may be a single MMU that has a secure side and a non-secure side, the secure side being able to manage access to the secure portion of the memory. An example of such an MMU 21 with a secure side 22 and non-secure side 24 is shown in FIG. 2.

Memory 30 has secure portions and non-secure portions, generally the secure portions are designated by setting a secure bit and addresses with the secure bit set can only be viewed via the secure memory management unit 24 from secure mode.

In this embodiment, data processing apparatus 5 also has a cryptography accelerator 40 which is a hardware device designed to perform cryptographic tasks such as AES encoding. It will be appreciated that performing these cryptographic tasks requires the use of cryptographic keys. These keys should never be made available to the non-secure side of the data processor otherwise the security of the system is compromised.

Conventionally, when cryptographic processes are to be performed, the core 10 has switched to secure mode before accessing the secure data and performing the functions. However, switching from secure to non-secure mode requires various handling routines to be run to ensure that any data processed by secure processes will not then be available to non-secure processes. This is costly in terms of performance.

In this embodiment of the present invention, data processor 10 performs a set up routine when in secure mode to set up cryptography device 40 with the data it needs such that it can perform its cryptographic tasks. This can be done for a particular application. Thus, if the core is to process a particular application that requires cryptographic functions to be performed, this application will typically call the cryptography device 40 to perform these functions several times while it is being run. In this embodiment before running the application, the core 10 switches to secure mode and runs a setup routine. This setup routine stores one or more addresses in secure data store 42 on cryptography device 40 indicating where in the secure portion of the memory the keys required for performing the cryptographic processes are stored. Once this information is stored within cryptography device 40 then data processor 10 can switch back to non-secure mode and run the user application that calls for the cryptographic processes to be performed. Thus, while the application is running it will issue task requests to cryptography device 40 whenever it wishes a cryptographic function to be performed. Cryptography device 40 has at least one secure address stored in data store 42 and can therefore access this secure address within secure memory 30. Thus, it can perform the cryptographic function using a cryptography key stored at that address. As the cryptography device 40 is a hardware non-programmable device it is very secure from unauthorised access.

In this embodiment, the setup operation is performed for a particular application and when the data processor core 10 context switches to a different application a further setup process is performed for the new application, if the new application is one which requires a cryptographic task to be performed.

In an alternative embodiment, the processor core may at reset perform a setup operation from secure mode to set up the cryptography device so that it can perform tasks called from a number of applications that the core 10 may run. This involves storing more secure data in cryptography device 40. This data may for example be stored in the form of a register value 44 and a corresponding table 42 of offset values to this register value (see FIG. 2). These offset values may be stored associated with hash values. The offset values relate to offsets to the address stored in register 44 and provide pointers to storage locations in secure memory of different keys. Thus, if application 1 requires task 1 to be performed which needs key 2 it will request the key from storage location 2 within table 42. In order to be able to use this key it will need to provide the hash value that corresponds with this storage location. This provides extra security as if the application has not been provided with the correct hash value the further processing device will not be able to access the storage location indicated by the offset stored in element 2 of the table and will not perform this task.

Additional data storage locations within table 42 may relate to addresses within secure portion of the memory 30 which the cryptography device 40 may store data to. This can be useful where, for example, the cryptography device is being used by a non-secure user application to decrypt video data. Once decrypted it is important that this video data is still stored securely so that it cannot be copied in its unencrypted form except under the control of the secure side of the system. Thus, by providing a pointer to the secure portion of the memory the cryptography device 40 can store this sensitive data in a secure portion of the memory 30 and thereby enable its access to be controlled.

It may be that although the cryptography device 40 was set up to process a number of applications at reset a new application is processed by core 10 that the cryptography device is not set up to perform. In such a case, context switching to this application will cause processor core to switch to monitor mode and perform a further set up routine to the cryptography device so that it is enabled to perform tasks requested by this application as well as the others.

FIG. 2 shows cryptography device 40 in greater detail. Cryptography device 40 comprises circuitry 41 for performing the cryptography function and further comprises circuitry for detecting suspicious behaviour along with hash comparator circuitry 45. A request to perform a particular task is received from core 10 and this request indicates which key it requires to perform the function and provides the appropriate hash. The hash comparator 45 will check that the hash is correct and if it is the key will be accessed via secure portion 22 of MMU 21 from the secure portion of the memory at the location indicated by address 44 and offset 2 and the cryptographic function will be performed by circuitry 41. Any data required during the cryptography function that is not secure is accessed by this circuitry via non-secure memory management unit 24.

If suspicious behaviour detector circuitry 43 determines that a number of requests using the same key but using different data are received from core 10 then it will trigger a secure interrupt and this will be sent to core 10 which switches immediately to monitor mode and performs an analysis of the application.

The secure interrupt can also be generated automatically in response to any non-secure request if device 40 is set up to do this. This would provide a particularly secure system where any call to use a cryptographic function from a non-secure user application results in the integrity of the non-secure user application being tested by the secure mode of the core 10. As the monitor mode is initiated by the secure interrupt generated by the further processing device, the switch to secure mode is performed with far fewer cycles than would be the case if it was called in response to software within the user application itself. Data store 42 may further comprises offset addresses that do not relate to storage locations for keys but relate to storage locations within secure portions of the memory that can be used by the cryptography device 40 to store decrypted data in secure portions of the memory.

It should be noted that the device 40 can be set up such that the addresses within the secure portion of the memory 30 that it can access are restricted to within certain values. This provides additional security and enables certain parts of the memory not to be accessible from this device.

It should be noted that this device comprises circuitry to perform the functions and is in effect a hardware device that performs functions it is configured to perform extremely efficiently and without software intervention. This not only makes it efficient but also makes it secure.

Figure 3:
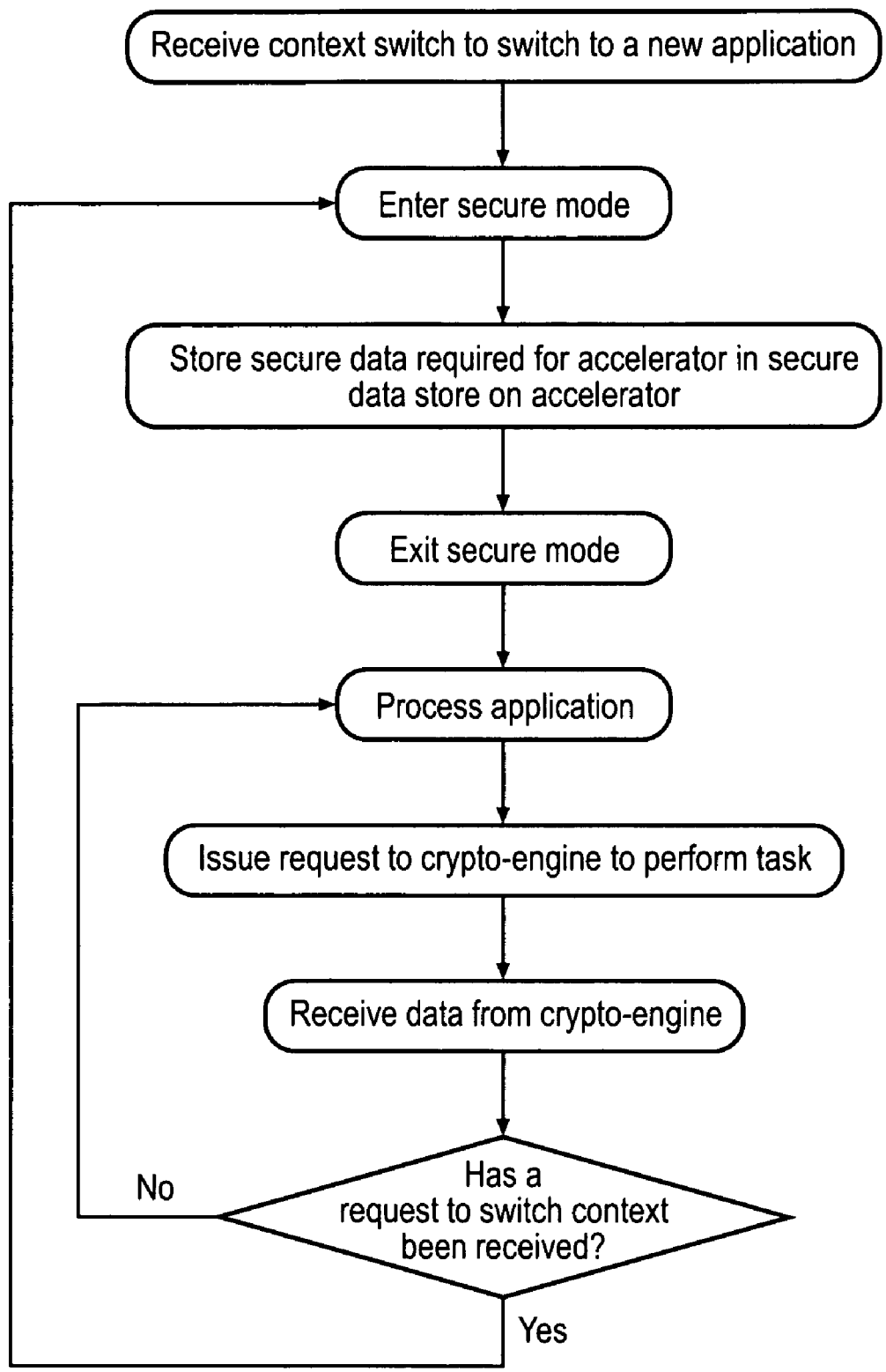
FIG. 3 shows a method performed by a data processor according to an embodiment of the present invention.

FIG. 3 shows method steps performed by a data processor according to an embodiment of the present invention. In this embodiment, the core is configured to set up the accelerator separately for each application that it processes.

Thus, in response to receiving a context switch indicating a switch to a new application, it enters secure mode and performs the setup operation of the accelerator, in this embodiment a crypto-engine, by storing secure data required for this accelerator to perform its functions in the secure data store of this accelerator. It then exits secure mode and commences to process the application. During processing of the application it will issue requests to crypto-engine to perform tasks and it will receive data form the crypto-engine. If there is a further request to switch context to a new application that requires the crypto-engine to perform functions for it, then it will again enter secure mode and perform a further set up task for this new application.

Figure 4:
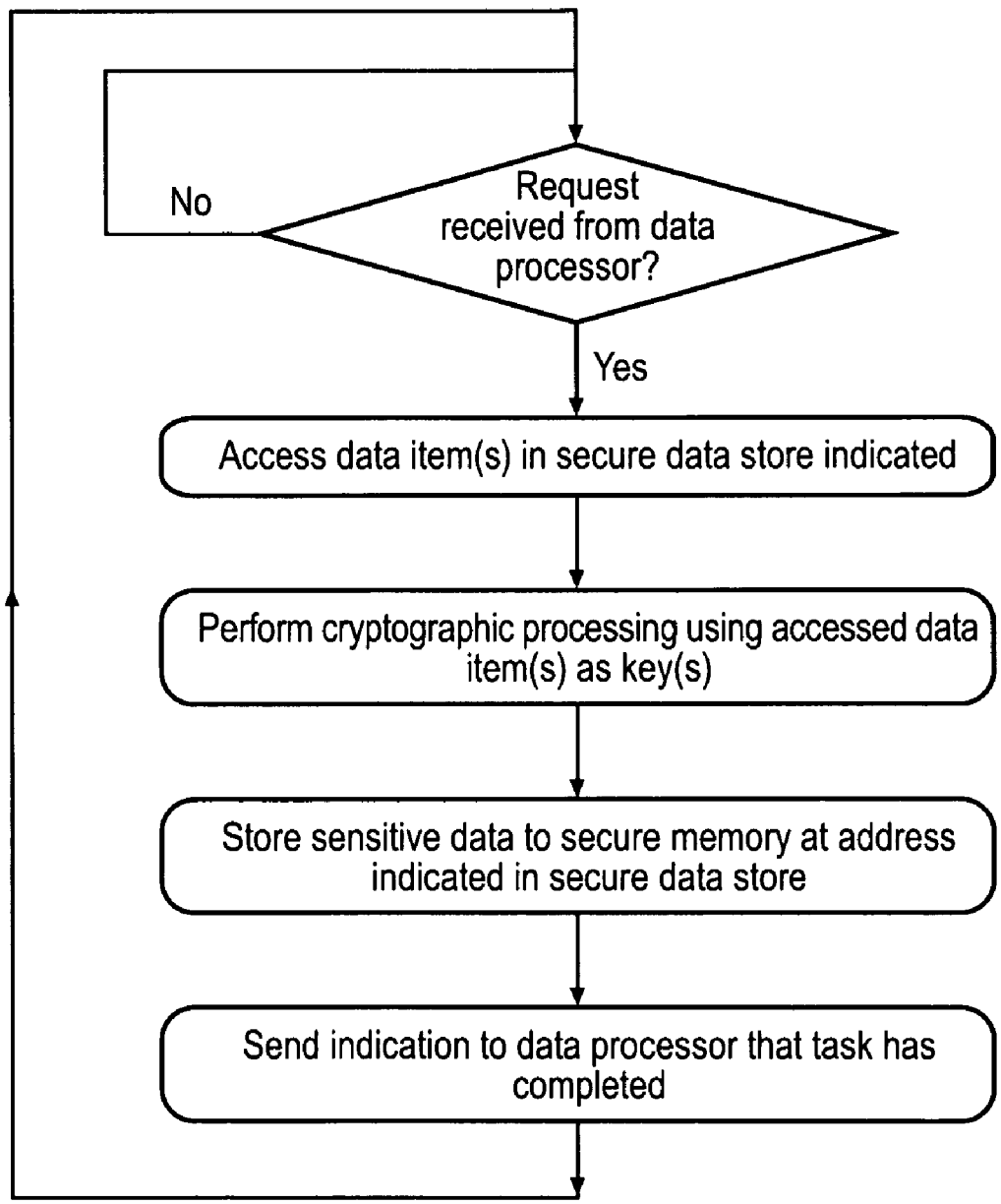
FIG. 4 shows the steps of a method performed by an accelerator according to an embodiment of the present invention.

FIG. 4 shows a flow diagram illustrating steps performed by the accelerator itself. It polls an input to see if a request is received from the data processor. If a request is received it accesses data items in a secure data store indicated by the request. These secure data items may be addresses within the secure side of the memory and it will then access these addresses to retrieve the secure data it needs for processing its task. It will then perform its task using the accessed data items.

It then stores any sensitive data it generates in secure memory at an address indicated within the secure data store. When it has completed its task it sends an indication to the data processor that the task is completed and it once again polls the data processor for requests to perform further tasks.

The above techniques are related to the techniques described in co-pending US patent applications entitled "Protecting the security of secure data sent from a central processor for processing by a further processing device" and "Controlling Cleaning Of Data Values Within A Hardware Accelerator" and bearing Attorney references ⁓⁓⁓⁓⁓⁓ 550-996. The disclosure of these two co-pending applications is incorporated herein in its entirety.

Further details of different techniques used with the further processing device or hardware (HW) assist in a ARM® data processing apparatus are disclosed below.

The general execution model for user mode HW assist wishing to access secure side data is that a secure session has already been established by the secure side or trustzone (TZ) software before the HW assist attempts to access the secure side.

There are four potential ways of managing a secure session for a HW assist that needs to access data from the secure side.

Default software (SW) entry to secure side with all security in SW. Every time a secure service is required, privilege mode is entered and then an SMC (call to secure side) executed to enter the secure monitor. The secure service is then provided and the program then returns to the user mode application.

Cause an entry in the secure monitor directly on an attempt to access the HW assist. In this mode the secure side is entered every time the HW assist is called and the secure session can be managed directly by the secure side. Secure side SW can also run whatever integrity checking is needed and then call the HW to perform the task. This can be implemented by disabling non-secure access to the HW assist.

Set up a global secure session and provide each process that requires secure access with a pre-defined index into a table of secure values that are available to the non-secure side. Each table value is paired with a hash value to ensure only the process with the correct hash can access a particular table entry. The secure session is set up at process creation time where the available table entries and protecting hash values are calculated. The secure side also writes the address of the secure base table and valid table ranges in to a secure mode only register in the HW assist. To access a secure item from an application program the HW assist is user programmed with a offset and a hash value. The HW assist module then uses these values to access the secure information and check the hash. In this model the secure session is still a global view so the secure monitor does not need to be called on a regular operating system context switch—the offset and hash can be stored in the processes application space on context switch.

Set up a secure session per process. In this model each process effectively has its own secure session. The secure session gets set up when the process is context switched in and the session is closed at the end of the context. Instead of accessing the secure monitor on every access to the HW assist the secure monitor is accessed only on start and end of context. The advantage with this model is that any secure state that is stored in the HW assist can also be saved at context switch time either by the secure monitor directly or by having a secure shadow of a CA_STATUS register. The CA_STATUS register is a register that provides status for the HW assist module, and has privileged access.

A HW assist can be interrupted while running before the task is completed and then restarted at some later time as required. If an interrupt is received while a HW assist is running then the interrupt is entered in the usual ARM® manner without any changes to the HW assist. In the interrupt handler the programmer has the following options:

1. Do nothing to the HW assist and let it continue running. Note that the system programming of the core must ensure that the HW assist still sees that correct view of memory (i.e. the page tables have not been changed).
2. Temporarily suspend the HW assist but not use the HW assist for anything else. (MSUSPEND)
3. Suspend the HW assist and save any dirty state back to memory so the HW assist can be used by something else. (MSUSPENDC)

Figure 5:
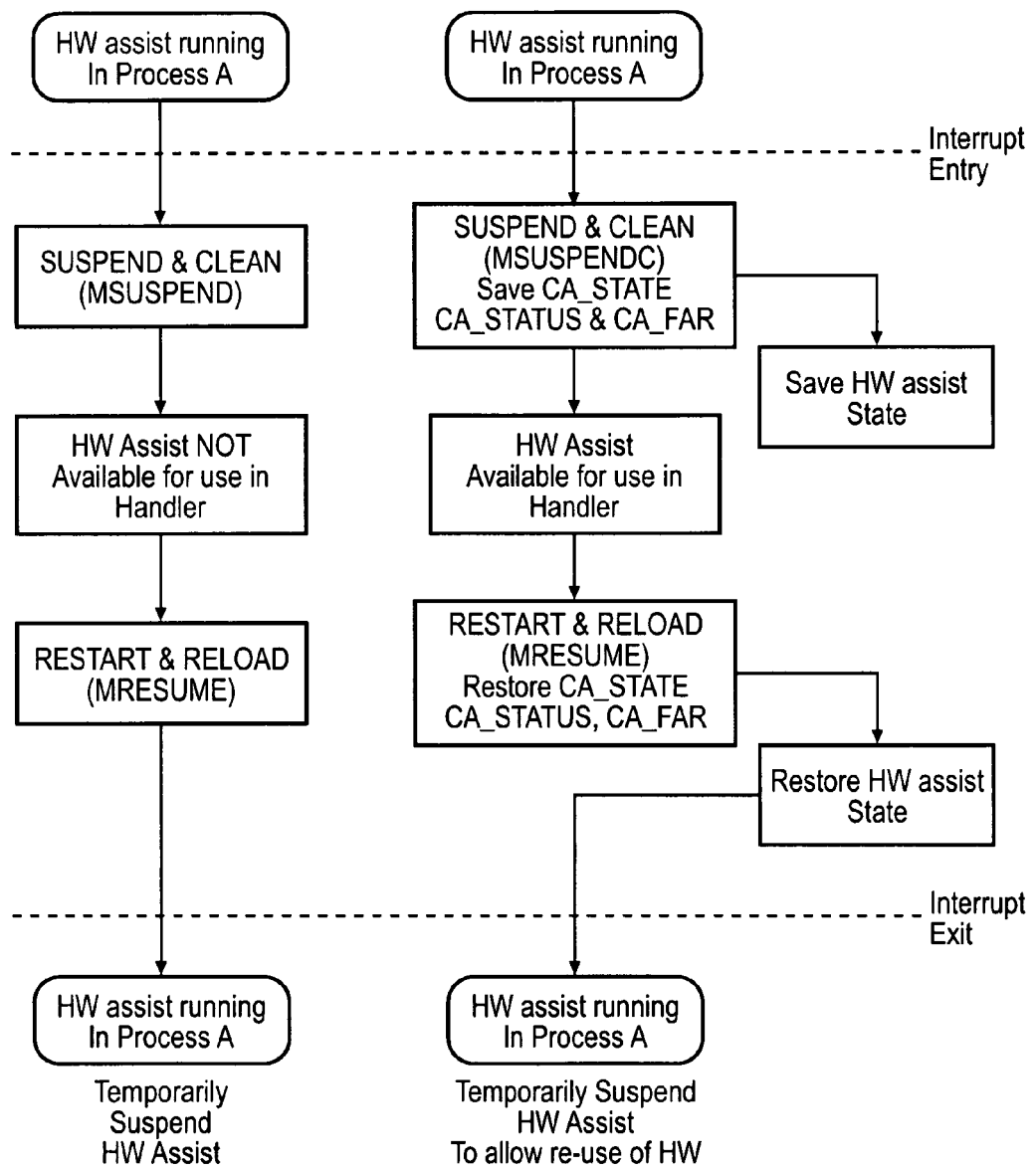
FIG. 5 shows the control flow for suspending and resuming hardware assists on interrupt.

In the case of (2) & (3) once the interrupt handler is complete the HW assist is restarted with a resume command. For (2) execution restarts from where it left off, whereas in (3) the intermediate state must be reloaded back to the HW assist first before execution continues. FIG. 5 shows the control flow for both these cases. In this figure the CA_STATE register is a register that contains a pointer to the descriptor for the HW assist module and has privileged or user access.

For a generic interrupt handler the broadcast forms of MSUSPEND and MRESUME can be used to suspend and resume all HW assist. For more specialized applications individual HW assist modules can be suspend and resumed independently (by supplying the logical address of the HW assist to control). There are three basic classes of exceptions that need to be handled:

User errors—which are handled by user mode SW
Privileged system errors—system errors that are signaled to the operating system for handling Secure errors—errors caused by accessing the secure side signaled to the secure monitor.

By default the privilege and security errors are signaled to the core via an interrupt for further handling. It is expected that user mode errors are handled by the user application software checking a status error bit in a HW assist register (e.g. IUE bit of the CA_Status register). The architecture also supports allowing user mode errors to signal and interrupt the core if required but this will incur the cost of dealing with an operating system.

In cases where multiple exceptions can be active from different privilege levels shadow control registers are provided to store exception information. For example if secure and user memory faults can occur then the FAR and CA_STATUS register must have a shadow in the secure side. The FAR register has privileged access and provides the memory address that faulted.

The basic operations required to support context switching are similar to the basic interrupt handling, i.e. suspending and resuming HW assist operation and cleaning dirty state from HW assist modules. Context switching can be broken in two parts Switching a old Process out
Switch a new Process in
For each of these there are two possibilities
Strict—do the switch immediately
Lazy—only do save the state if someone else actually wants to use the HW assist.

The latter is lower power because it only saves the state when necessary but is more complicated to implement.

Figure 6:
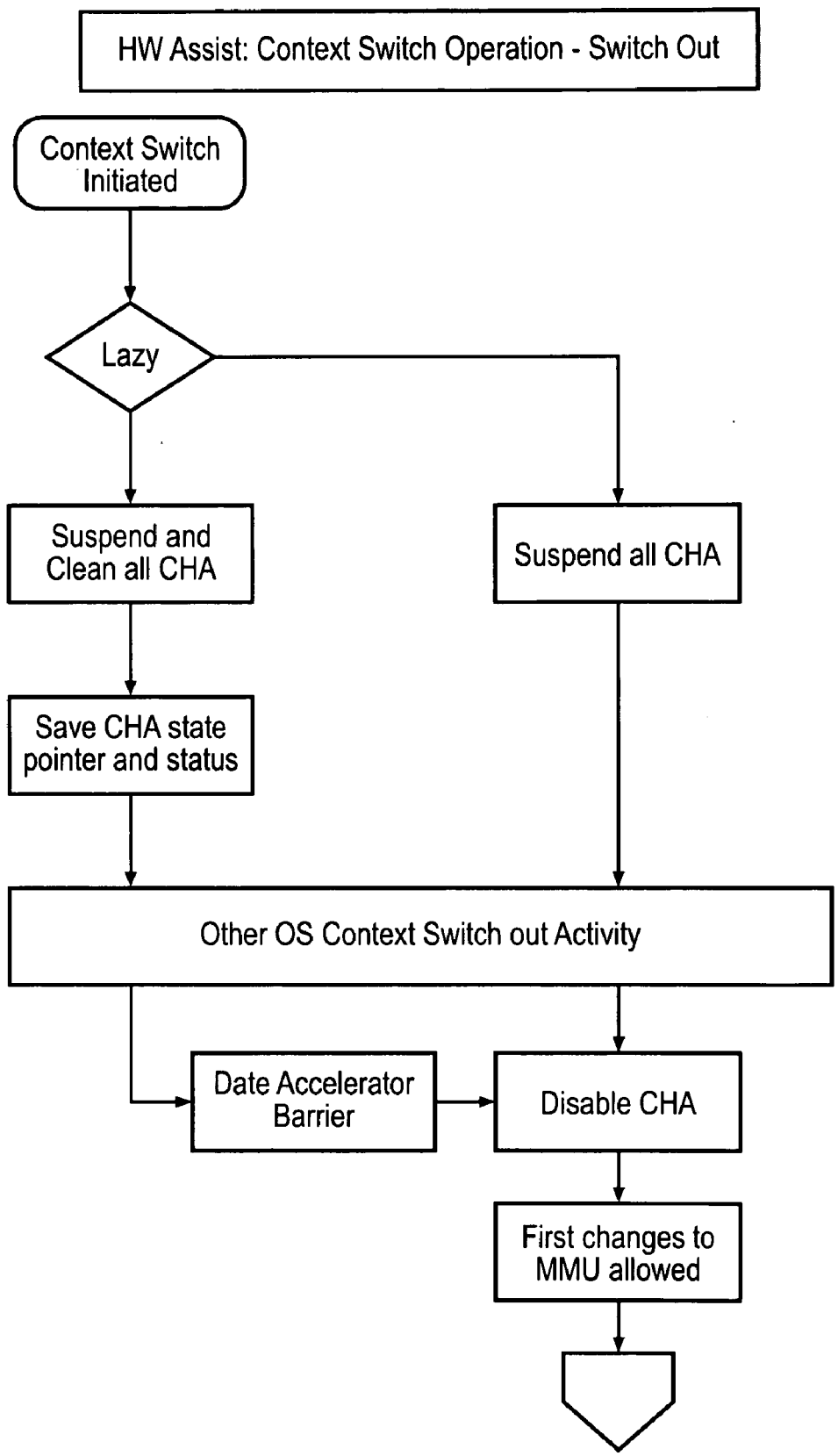
FIG. 6 shows a flow diagram for context switching out.

Note: the traditional lazy context switch (e.g. as used in VFP) does not switch in the new context until the HW is accessed by the new process. In this technique if the new context has a HW assist that was suspended then it needs to restart as soon as context is restored not wait until the first new access to the HW in the new context, FIG. 6 shows the generic flow for switching the context for a HW assist module (CHA). If the context switch is not lazy then the HW assist is suspended and cleaned by using a MSUSPENDC and the pointer to the descriptor, the status register and FAR for each enabled HW assist is saved. In the case of lazy context switch the HW assist is just suspended without saving any state. In both cases the operating system can then proceed to do other context switch clean up while waiting for the HW assist to stop (and potentially clean). Just before the page table entries need to be changed the operating system executes a Data accelerator barrier (DAN) to make ensure all HW assist have finished suspending and then all HW assist are disabled in HACR. Context switch out then continues as normal.

It is possible to refine the generic context switch out at the cost of more analysis by the operating system. For example If the HW assist module is not currently enabled then there is no process context to save and nothing needs to be done.

If the HW assist is enabled but not running—no dirty state potentially needs saving.

May choose to allow HW assist to complete rather than suspending it—this ensures all dirty data is back in memory also.

Figure 7:
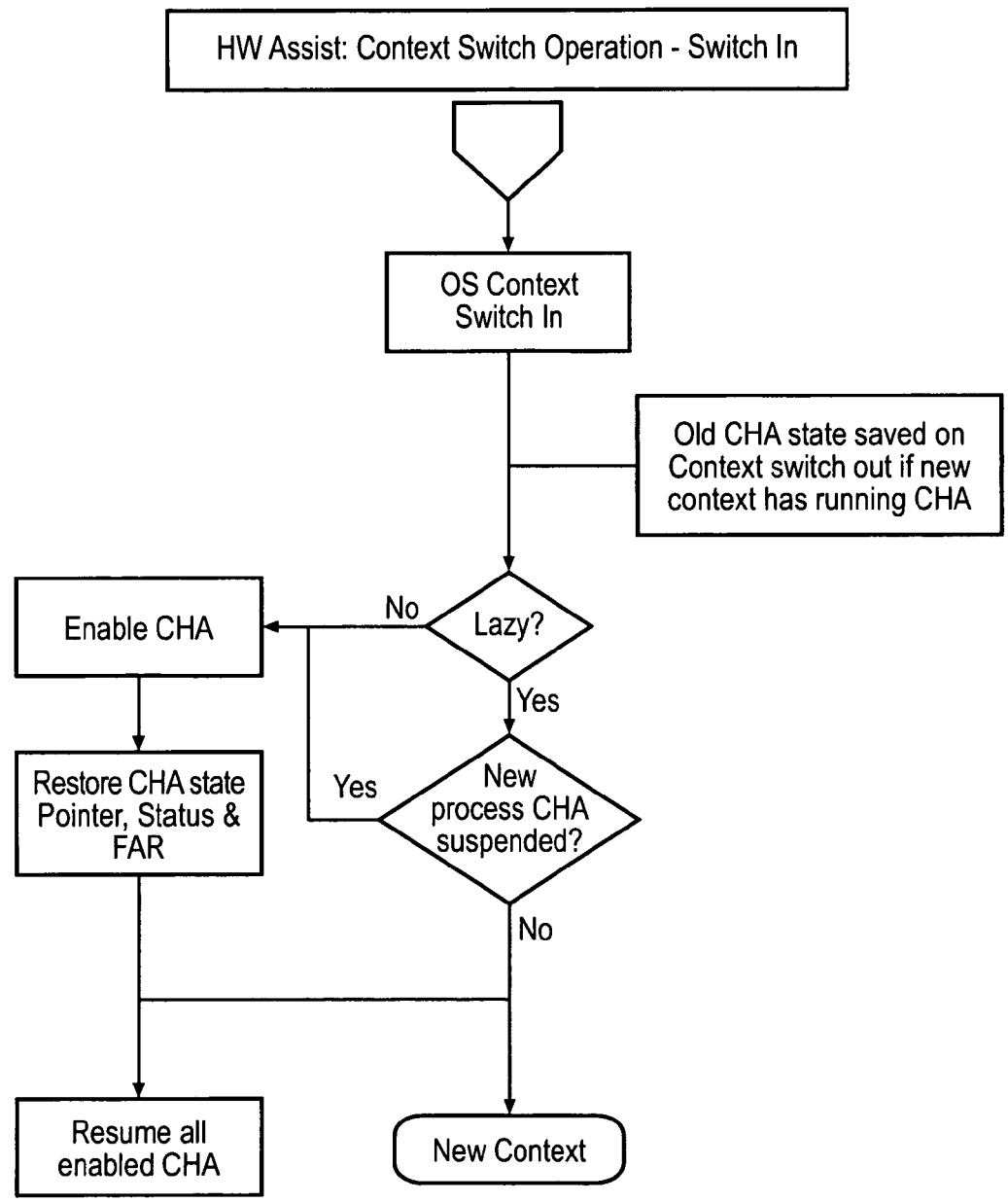
FIG. 7 shows a flow diagram for context switching a process into a hardware assist module.

When switching a new process into a HW assist module the first step is to enable the HW assist module. After this the descriptor and status registers are reloaded into the HW assist module and a resume all command is issue to resume execution of all enabled HW assist modules. This is shown in FIG. 7.

If a lazy scheme is employed (i.e. the state of the old process has not yet been switched out) the operating system should determine whether the new process has suspended HW assist modules. If the new context is using HW assist then the old state out should be cleaned of the HW assist at context switch time (rather than deferring till it is accessed later)

Deferred Context Switch In

The deferred process state switch waits until the new process attempts to access the HW assist module before saving any state. If the new process does not use the HW assist module then no state needs to be saved.

Figure 8:
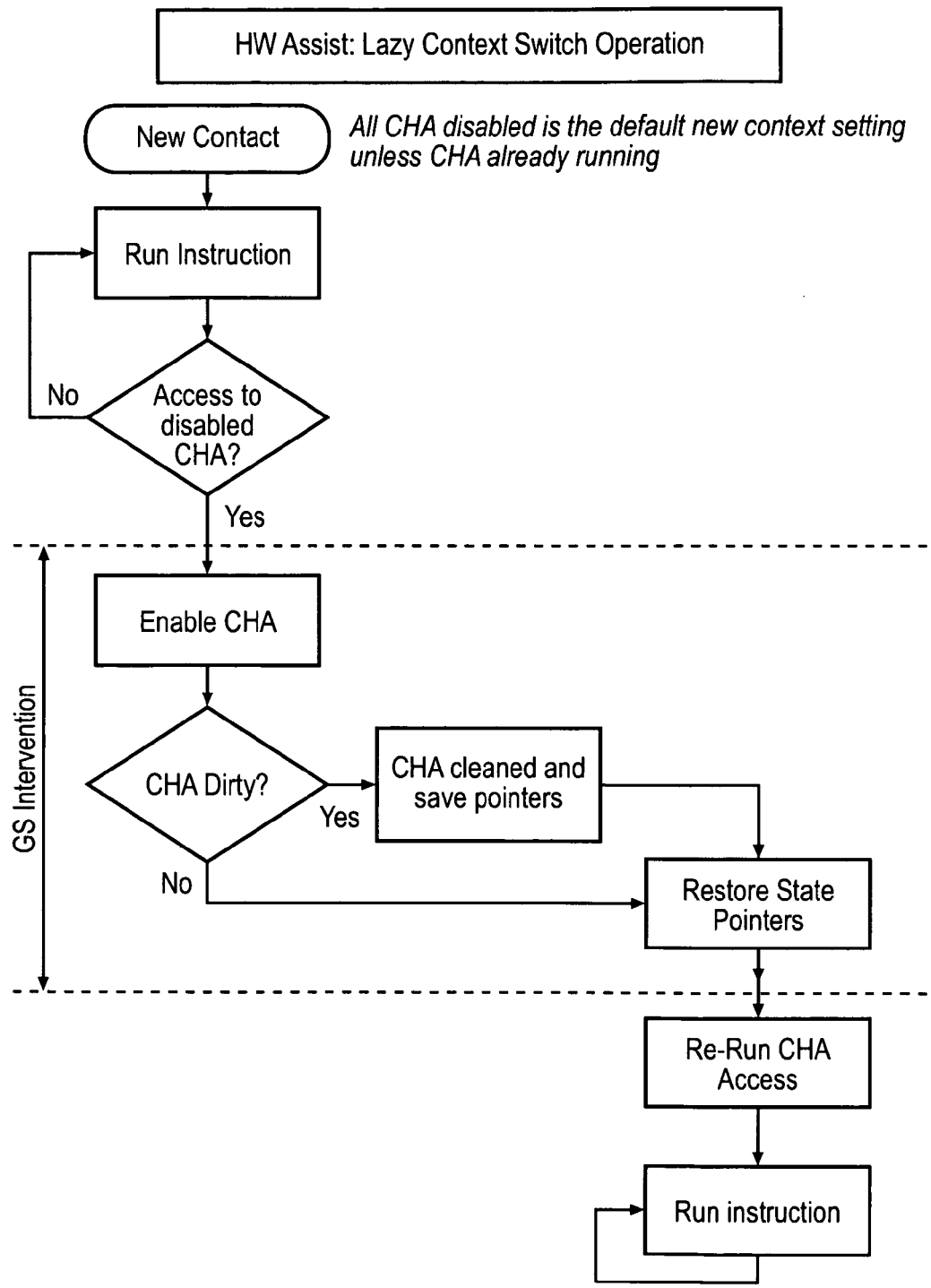
FIG. 8 shows a flow diagram illustrating deferring a hardware assist state save until the first new process access.

To detect when the new process attempts to access the HW assist module the module is disabled at context switch time so that an attempt to use it triggers an event in the operation system that can save and restore the required state (undefined instruction trap). Once the old state has been saved and the new state loaded the command accessing the HW assist can be re-run. This procedure is shown in FIG. 8. It is assumed that suspended HW assist are detected at context switch in time and are automatically restarted rather than waiting for a command to access them.

Note that the operating system must be able to access the user space descriptor of the previous HW assist context to save the HW assist state to the correct location.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   a data processor for processing data in a secure and a non-secure mode;
   a memory for storing said data, said memory comprising a secure portion and a non-secure portion, said data processor in said secure mode having access to data stored in said secure portion that is not accessible to said data processor in said non-secure mode; and
   a further processing device for performing a task in response to a request from said data processor issued from said non-secure mode, said task comprising processing data at least some of which is secure data, said further processing device comprising a secure data store, said secure data store not being accessible to processes running on said data processor in non-secure mode; wherein
   prior to issuing said request, said data processor is adapted to perform a set up operation on said further processing device, said set up operation being performed by said data processor operating in said secure mode and comprising storing secure data in said secure data store on said further processing device, said secure data being secure data required by said further processing device to perform said task; wherein
   in response to receipt of said request from said data processor operating in said non-secure mode, said further processing device performs said task using data stored in said secure data store to access any secure data required that is stored in said secure portion of said memory, wherein said stored secure data comprises at least one address in said secure portion of said memory, said further processing device accessing secure data stored in said at least one address while performing said task.

2. A data processing apparatus according to claim 1, wherein said further processing device is adapted to store at least some data generated while performing said task in said secure portion of said memory at a place indicated by at least one of said at least one address.

3. A data processing apparatus according to claim 1, wherein said data processor is adapted to process a plurality of applications and is adapted to perform said set up operation in response to a context switch to any one of said plurality of applications that issued said request during processing.

4. A data processing apparatus according to claim 1, wherein said data processor is adapted to process a plurality of applications and is adapted to perform said set up operation following reset for at least some of said plurality of applications and is adapted to additionally perform said set up operation for a further application not previously set up in response to detecting a context switch to said further application.

5. A data processing apparatus according to claim 1, wherein said data processor is adapted to process a plurality of applications and is adapted to perform said set up operation following reset for said plurality of applications and not to perform said set up operation again.

6. A data processing apparatus according to claim 1, wherein said data processor further comprises a monitor mode switching between processing in said secure and non-secure modes being performed via said monitor mode.

7. A data processing apparatus according to claim 6, wherein said further processing device is responsive to receipt of said request to issue a secure interrupt to said data processor, said secure interrupt causing said data processor to switch to said monitor mode and to perform an integrity check of said application issuing said request, said further processing device performing said task following receipt of a signal from said data processor indicating a positive integrity check.

8. A data processing apparatus according to claim 6, wherein said further processing device is adapted to detect predetermined behavior with respect to a plurality of requests issued by said data processor and in response to detection of said predetermined behavior generates a secure interrupt, said secure interrupt causing said data processor to switch to said monitor mode.

9. A data processing apparatus according to claim 8, wherein said predetermined behavior comprises receipt of a plurality of requests with a same key and different data.

10. A data processing apparatus according to claim 1, wherein said secure data store of said further processing device is configured to store a table of secure data items and a hash value associated with each data item within said table, said table being filled during said set up operation, said request issued from said data processor requesting an item from said table and supplying a corresponding hash value with said request, said further data processing device only allowing use of said requested item in response to said hash value supplied matching said hash value stored in association with said requested item.

11. A data processing apparatus according to claim 10, wherein said further processing device further comprises a secure register, said secure register being filled with an address in a secure portion of said memory and said table being filled with offset values to said address and corresponding hash values during said set up operation.

12. A data processing apparatus according to claim 1, wherein said further processing device comprises a cryptography processing device and said stored secure data comprises at least one address of a cryptography key.

13. A data processing apparatus according to claim 1, wherein said further processing device comprises a non-programmable hardware device.

14. A data processing apparatus according to claim 1, wherein said further processing device is constrained such that said at least one address is in a predetermined part of said secure memory portion and access to other parts of said secure memory portion are not allowed.

15. A method of processing data on a data processing apparatus comprising a data processor for processing data in a secure and a non-secure mode, a memory comprising a secure portion and a non-secure portion, said data processor processing data in said secure mode having access to secure data stored in said secure portion of said memory that is not accessible to said data processor processing data in said non-secure mode and a further processing device comprising a secure data store, said method comprising the steps of:
when said data processor is operating in said secure mode, performing a set up operation on said further processing device comprising storing secure data in said secure data store on said further processing device, said secure data being secure data required by said further processing device to perform a task, said task comprising processing data at least some of which is secure data;
when said data processor is operating in said non-secure mode, processing an application and issuing a request to said further processing device to perform said task while processing said application; and
in response to receipt of said request, said further processing device performing said task using data stored in said secure data store to access any secure data required that is stored in said secure portion of said memory, wherein said stored secure data comprises at least one address in said secure portion of said memory, said further processing device accessing secure data stored in said at least one address while performing said task.

16. A method according to claim 15, wherein said further processing device stores at least some data generated while performing said task in said secure portion of said memory at a place indicated by at least one of said at least one address.

17. A method according to claim 15, wherein said data processor is adapted to process a plurality of applications and said method comprises performing said set up operation in response to detecting a context switch to a new application.

18. A data processing apparatus comprising a memory having a secure portion and a non-secure portion, a processing means for processing data in a secure and a non-secure mode, said processing means in said secure mode having access to secure data stored in said secure portion of said memory that is not accessible to said processing means in said non-secure mode; and
a further processing means for performing a task in response to a request from said processing means issued from said non-secure mode, said task comprising processing data at least some of which is secure data, said further processing means comprising a secure data store, said secure data store not being accessible to processes running on said processing means in non-secure mode; wherein prior to issuing said request, said processing means is configured to perform a set up operation on said further processing means, said set up operation being performed by said processing means operating in said secure mode and comprising storing secure data in said secure data store on said further processing means, said secure data being secure data required by said further processing means to perform said task; wherein in response to receipt of said request from said processing means operating in said non-secure mode, said further data processing means performs said task using data stored in said secure data store to access any secure data required that is stored in said secure portion of said memory, wherein said stored secure data comprises at least one address in said secure portion of said memory, said further processing means accessing secure data stored in said at least one address while performing said task.

* * * * *